US010296102B1

(12) United States Patent
Misra et al.

(10) Patent No.: US 10,296,102 B1
(45) Date of Patent: May 21, 2019

(54) GESTURE AND MOTION RECOGNITION USING SKELETON TRACKING

(71) Applicant: Piccolo Labs Inc., San Francisco, CA (US)

(72) Inventors: Marlon Misra, San Francisco, CA (US); Neil Raina, San Francisco, CA (US)

(73) Assignee: Piccolo Labs Inc., San Francisco (*) Notice: Subject to any disclaimer, the term of this patent is extended or adjusted under 35 U.S.C. 154(b) by 0 days.

(21) Appl. No.: 16/007,894

(22) Filed: Jun. 13, 2018

Related U.S. Application Data

(60) Provisional application No. 62/624,777, filed on Jan. 31, 2018.

(51) Int. Cl.
| | |
|---|---|
| *G06F 3/01* | (2006.01) |
| *G06K 9/00* | (2006.01) |
| *G06K 9/20* | (2006.01) |
| *G06T 7/11* | (2017.01) |
| *G06T 7/73* | (2017.01) |
| *G06T 7/215* | (2017.01) |
| *G06T 7/246* | (2017.01) |

(52) U.S. Cl.
CPC ......... *G06F 3/017* (2013.01); *G06K 9/00355* (2013.01); *G06K 9/2054* (2013.01); *G06T 7/11* (2017.01); *G06T 7/215* (2017.01); *G06T 7/246* (2017.01); *G06T 7/73* (2017.01); *G06T 2207/10016* (2013.01)

(58) Field of Classification Search
CPC .......... G06F 3/011; G06F 3/017; G06F 3/005; G06K 9/00335; G06K 9/00342; G06K 9/00355; G06K 9/00362; G06K 9/00369; G06K 9/00375; G06K 9/00382; G06K 9/00389; G06K 9/2054; G06K 9/2081; G06K 9/3233; G06K 9/3241; G06K 9/46; G06T 7/10; G06T 7/11; G06T 7/20; G06T 7/215; G06T 7/246; G06T 7/292; G06T 7/73; G06T 7/74; G06T 7/75; G06T 2207/10016; A61B 5/1128
See application file for complete search history.

(56) References Cited

U.S. PATENT DOCUMENTS

| | | | | |
|---|---|---|---|---|
| 2010/0303289 | A1* | 12/2010 | Polzin | G06K 9/00342 382/103 |
| 2012/0308140 | A1* | 12/2012 | Ambrus | G06K 9/00362 382/190 |
| 2012/0309517 | A1* | 12/2012 | Al-Ghosien | H04N 13/0253 463/31 |
| 2013/0278504 | A1* | 10/2013 | Tong | G06K 9/00355 345/158 |
| 2013/0300644 | A1* | 11/2013 | Chen | G06F 3/017 345/156 |

(Continued)

*Primary Examiner* — Keith L Crawley
(74) *Attorney, Agent, or Firm* — Cognition IP, P.C.; Bryant Lee

(57) ABSTRACT

A method and system may be used to determine gestures of one or more users from a video. Motion may be detected in an image frame of a video, and the image frame may be cropped around the motion. Body pose estimation may be performed on the cropped image frame. The location of the user's hands may be determined from the body pose. Additional processing may be performed to identify hand gestures.

20 Claims, 10 Drawing Sheets

(56) References Cited

U.S. PATENT DOCUMENTS

| | | | |
|---|---|---|---|
| 2013/0329947 A1* | 12/2013 | Wu | G06K 9/00624 |
| | | | 382/103 |
| 2015/0077336 A1 | 3/2015 | Elangovan | |
| 2015/0089453 A1* | 3/2015 | Dal Mutto | G06F 3/017 |
| | | | 715/852 |
| 2015/0117708 A1* | 4/2015 | Guigues | G06T 7/0042 |
| | | | 382/103 |
| 2015/0123890 A1* | 5/2015 | Kapur | G06F 3/0304 |
| | | | 345/156 |
| 2016/0148417 A1 | 5/2016 | Kim et al. | |
| 2016/0266653 A1* | 9/2016 | Liu | G06F 3/017 |
| 2017/0197636 A1 | 7/2017 | Beauvais et al. | |
| 2017/0212590 A1 | 7/2017 | VanBlon et al. | |
| 2017/0255832 A1* | 9/2017 | Jones | G06K 9/00771 |
| 2018/0024641 A1* | 1/2018 | Mao | G06T 7/251 |
| | | | 382/103 |
| 2018/0096690 A1 | 4/2018 | Mixter et al. | |
| 2018/0181197 A1 | 6/2018 | Teller et al. | |

* cited by examiner

GESTURE AND MOTION RECOGNITION USING SKELETON TRACKING

CROSS-REFERENCE TO RELATED APPLICATIONS

This application claims the benefit of U.S. Provisional Patent Application No. 62/624,777, filed Jan. 31, 2018, which is hereby incorporated by reference in its entirety.

FIELD OF THE INVENTION

The present invention relates to gesture recognition from one or more images.

BACKGROUND

The detection and recognition of user gestures from images currently requires complex sensor suites, involving, for example, time-of-flight sensors, structured light sensors, and the like. Moreover, algorithms for determining user gestures from the sensor data from these sensor suites are complex and slow. As a result, current gesture recognition systems are impractical from a cost perspective and offer a poor user experience due to lag.

It would be desirable to develop an algorithm that can determine user gestures more quickly and can work robustly on lower cost hardware, such as single video camera systems. While such an algorithm may optionally be used on higher-end hardware with complex sensor suites, one of the advantages is being able to provide fast and accurate gesture detection from a video.

SUMMARY OF THE INVENTION

One embodiment relates to a pipeline of operations performed on a computer to quickly and accurately determine gestures of one or more users from a video. Steps in the pipeline may include detecting motion in an image frame, cropping the image frame around the motion, performing body pose estimation from the cropped image frame, and predicting the user's gestures from the pose estimation.

One embodiment relates to a method for determining body pose and hand gesture of a user. A computer system may detect motion of a user in an image frame of the video. The computer system may crop the image frame around the motion of the user to create a cropped image and may determine the body pose of the user from the cropped image. After determining the body pose, the system may predict the locations of the hands of the user and crop the image frame near these locations to create one or more cropped images of the hands. The system may predict the state of one or both hands of the user using these cropped images of the hands.

One embodiment relates to a method for controlling an electronic device by recognizing human gestures. The method may include detecting motion of a user in an image frame of a video. Coordinates of the motion in the image frame may be determined. A bounding box around the motion in the image frame may be created based on the coordinates of the motion. The image frame may be cropped based on the bounding box around the motion to create a cropped image. A full-body pose estimation may be performed on the cropped image to determine coordinates of one or more body part keypoints and confidence values for one or more of the body part keypoints. An arm location model may be applied to one or more body part keypoints and a direction in which the user is pointing may be predicted. The location of a body part associated with the user's hands may be determined based on the body part keypoints. One or more cropped images of the hands of the user may be created by cropping the image frame near one or more body part keypoints representing a body part associated with the user's hands. The coordinates of one or more hand keypoints may be determined from the one or more cropped images of the hands of the user. A hand gesture model may be applied to one or more hand keypoints to predict the state of a hand of the user. An electronic device may be controlled based on the predicted state of the hand of the user.

One embodiment relates to a method for analyzing gestures occurring in different image frames over time and detecting a multi-frame gesture. An electronic device may be controlled based on the multi-frame gesture.

DETAILED DESCRIPTION

Figure 1:
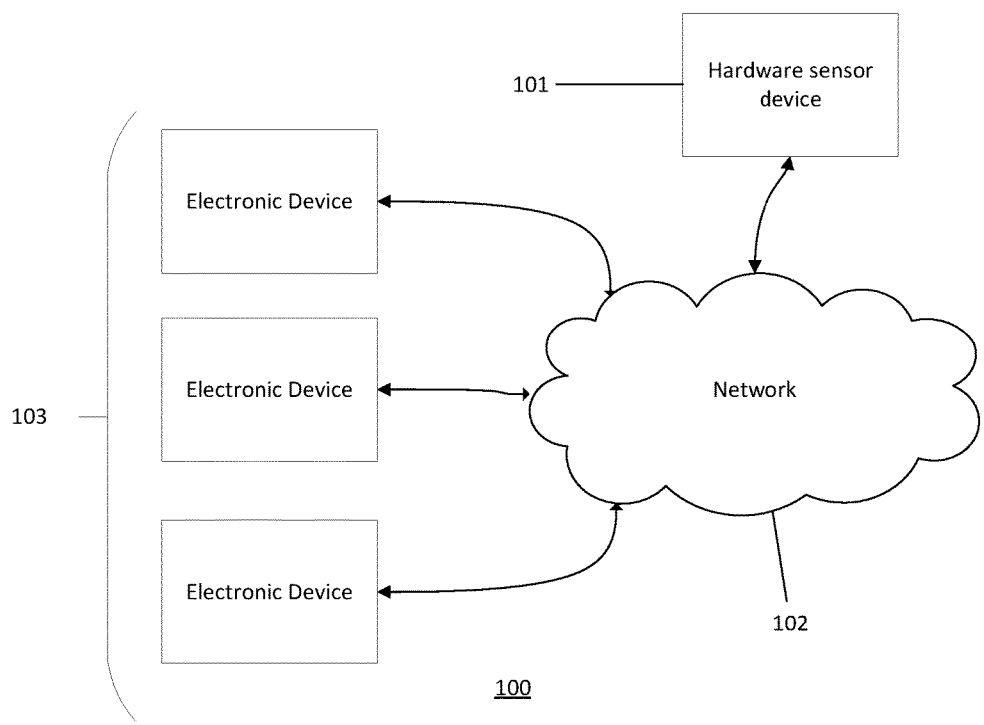
FIG. 1 illustrates an exemplary network environment that may be used in some embodiments.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Embodiments of the invention may comprise one or more computers. Embodiments of the invention may comprise software and/or hardware. Some embodiments of the invention may be software only and may reside on hardware. A computer may be special-purpose or general purpose. A computer or computer system includes without limitation electronic devices performing computations on a processor or CPU, personal computers, desktop computers, laptop computers, mobile devices, cellular phones, smart phones, PDAs, pagers, multi-processor-based devices, microprocessor-based devices, programmable consumer electronics, cloud computers, tablets, minicomputers, mainframe computers, server computers, microcontroller-based devices, DSP-based devices, embedded computers, wearable computers, electronic glasses, computerized watches, and the like. A computer or computer system further includes distributed systems, which are systems of multiple computers (of any of the aforementioned kinds) that interact with each other, possibly over a network. Distributed systems may include clusters, grids, shared memory systems, message passing systems, and so forth. Thus, embodiments of the invention may be practiced in distributed environments involving local and remote computer systems. In a distributed system, aspects of the invention may reside on multiple computer systems.

Embodiments of the invention may comprise computer-readable media having computer-executable instructions or data stored thereon. A computer-readable media is physical media that can be accessed by a computer. It may be non-transitory. Examples of computer-readable media include, but are not limited to, RAM, ROM, hard disks, flash memory, DVDs, CDs, magnetic tape, and floppy disks.

Computer-executable instructions comprise, for example, instructions which cause a computer to perform a function or group of functions. Some instructions may include data. Computer executable instructions may be binaries, object code, intermediate format instructions such as assembly language, source code, byte code, scripts, and the like. Instructions may be stored in memory, where they may be accessed by a processor. A computer program is software that comprises multiple computer executable instructions.

A database is a collection of data and/or computer hardware used to store a collection of data. It includes databases, networks of databases, and other kinds of file storage, such as file systems. No particular kind of database must be used. The term database encompasses many kinds of databases such as hierarchical databases, relational databases, post-relational databases, object databases, graph databases, flat files, spreadsheets, tables, trees, and any other kind of database, collection of data, or storage for a collection of data.

A network comprises one or more data links that enable the transport of electronic data. Networks can connect computer systems. The term network includes local area network (LAN), wide area network (WAN), telephone networks, wireless networks, intranets, the Internet, and combinations of networks.

In this patent, the term "transmit" includes indirect as well as direct transmission. A computer X may transmit a message to computer Y through a network pathway including computer Z. Similarly, the term "send" includes indirect as well as direct sending. A computer X may send a message to computer Y through a network pathway including computer Z. Furthermore, the term "receive" includes receiving indirectly (e.g., through another party) as well as directly. A computer X may receive a message from computer Y through a network pathway including computer Z.

Similarly, the terms "connected to" and "coupled to" include indirect connection and indirect coupling in addition to direct connection and direct coupling. These terms include connection or coupling through a network pathway where the network pathway includes multiple elements.

To perform an action "based on" certain data or to make a decision "based on" certain data does not preclude that the action or decision may also be based on additional data as well. For example, a computer performs an action or makes a decision "based on" X, when the computer takes into account X in its action or decision, but the action or decision can also be based on Y.

In this patent, "computer program" means one or more computer programs. A person having ordinary skill in the art would recognize that single programs could be rewritten as multiple computer programs. Also, in this patent, "computer programs" should be interpreted to also include a single computer program. A person having ordinary skill in the art would recognize that multiple computer programs could be rewritten as a single computer program.

The term computer includes one or more computers. The term computer system includes one or more computer systems. The term computer server includes one or more computer servers. The term computer-readable medium includes one or more computer-readable media. The term database includes one or more databases.

FIG. 1 illustrates an exemplary network environment 100 in which the methods and systems herein may operate. Hardware sensor device 101 may collect sensor data such as video. The hardware sensor device 101 may be connected to network 102. The network 102 may be, for example, a local network, intranet, wide-area network, Internet, wireless network, wired network, Wi-Fi, Bluetooth, or other networks. Electronic devices 103 connected to the network 102 may be controlled according to gestures captured and detected in video by the hardware sensor device 101. Gestures may be detected by processes described herein, which may be performed on the hardware sensor device 101 or on other computer systems.

Figure 2:
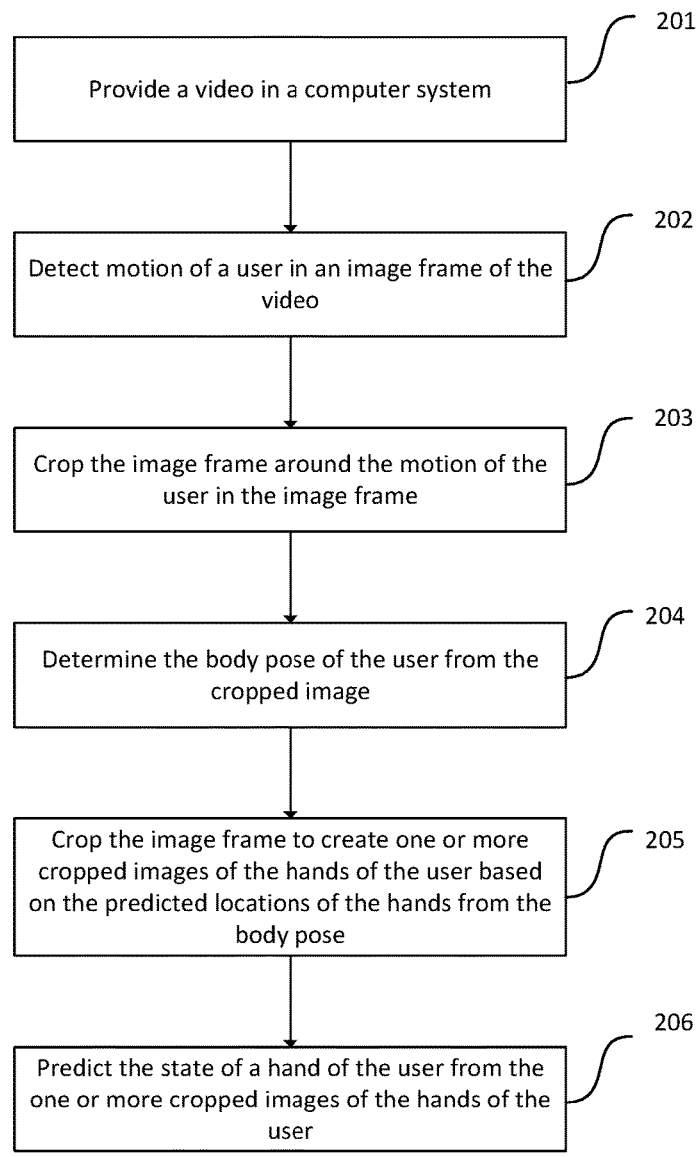
FIG. 2 is a flow chart illustrating an exemplary method that may be performed in some embodiments

FIG. 2 is a flow chart illustrating an exemplary method 200 that may be performed in some embodiments by a computer system. In step 201, a video is provided in a computer system, where the video may include one or more image frames. In step 202, the computer system detects motion of a user in an image frame of the video. In step 203, the image frame is cropped around the motion of the user to create a cropped image. In step 204, the body pose of the user is determined from the cropped image. Determining the body pose of the user from the cropped image rather than the full image frame may be faster and more efficient. In step 205, the image frame is cropped based on the predicted locations of the hands from the body pose to create one or more cropped images of the hands of the user. In step 206, the state of a hand of the user is predicted from the one or more cropped images of the hands of the user. Predicting the state of a hand of the user from the one or more cropped images of the hands of the user may be faster and more efficient than performing the operation on a larger image. The computer system may determine an overall gesture of the user from the user's body pose and the user's hand state.

For example, a gesture may be "arm raised with closed fist" or "arm in left direction with pointing index finger." The overall gesture of the user may be used to control an electronic device.

Figure 3A:
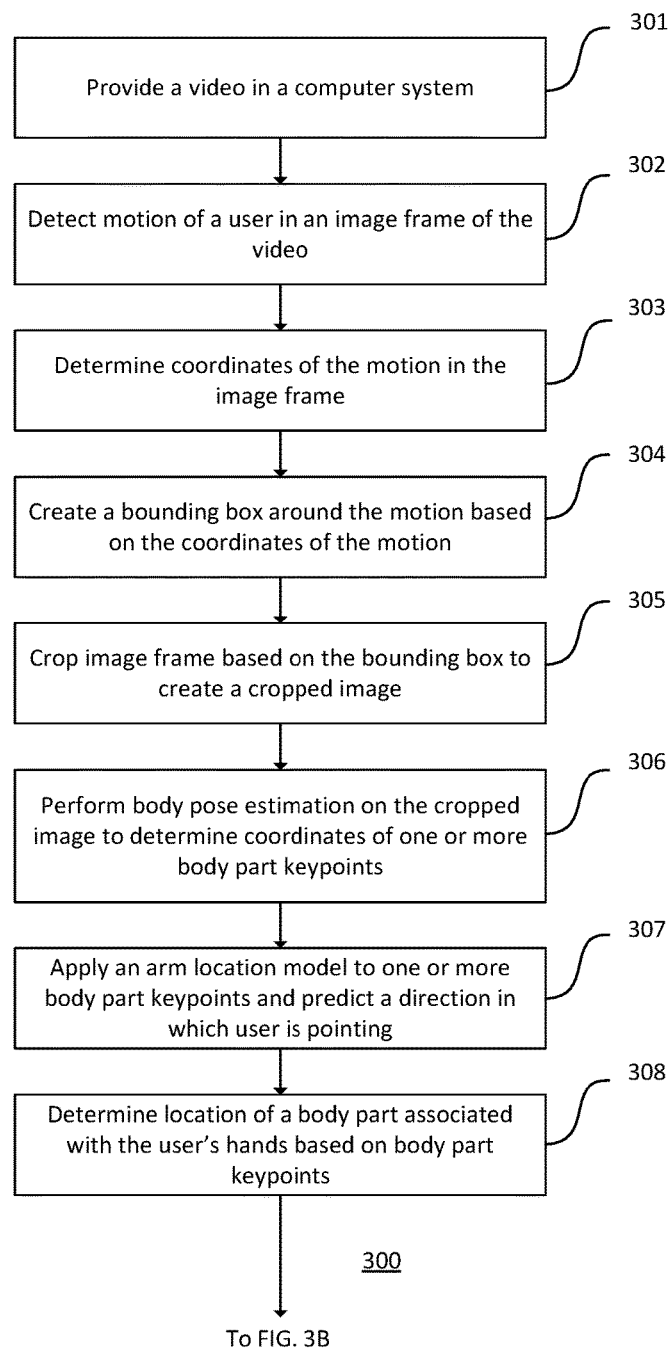
FIGS. 3A-B illustrate an exemplary method that may be performed in some embodiments
Figure 3B:
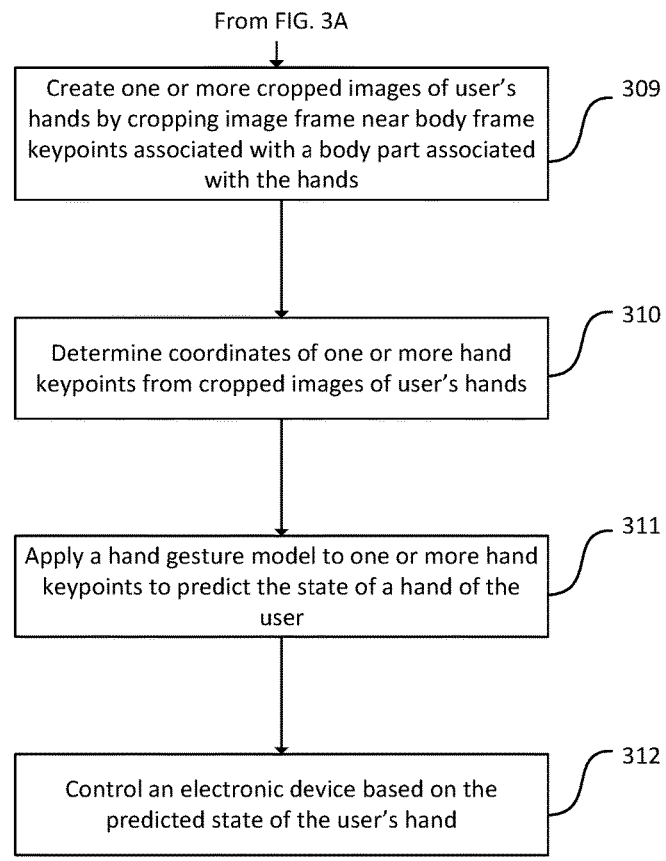

FIGS. 3A-B illustrate a flow chart of an exemplary method 300 that may be performed in some embodiments by a computer system. In step 301, a video is provided in a computer system, where the video may include one or more image frames. In step 302, the computer system detects motion of a user in an image frame of the video. In step 303, coordinates of the motion in the image frame are determined. One method of determining coordinates of motion in image frame is comparing consecutives frames of a video and determining coordinates where pixel values change or values derived based on the pixel values change. In some embodiments, the computer system detects motion by determining the amount that a pixel value has changed between frames, or the amount that another values based on the pixel value has changed, and comparing it to a threshold value. If the difference exceeds the threshold, then the computer system determines that motion has occurred in the image frame.

In step 304, a bounding box is created around the motion in the image frame based on the coordinates of the motion. In step 305, the image frame is cropped based on the bounding box around the motion to create a cropped image. In some embodiments, cropping may be performed on the exact coordinates of the bounding box, but in other embodiments the cropping may be performed on coordinates somewhat inside or somewhat outside of the bounding box. This may allow for slight variance in the detection of motion. In step 306, a body pose estimation is performed on the cropped image to determine the coordinates of one or more body part keypoints and confidence values for the one or more of the body part keypoints. In some embodiments, this may be a full body pose estimation. The return value of the body pose estimation may be a skeleton comprising one or more body part keypoints that represent locations of body parts. The body part keypoints may represent key parts of the body that help determine a human pose. Body part keypoints include an identifier of a particular body part, such as the right elbow, and a location in three-dimensional space. Body pose estimation may be performed, for example, based on features that tend to characterize certain parts of the human body. For instance, features may include image silhouettes, color, edges, gradients, shading, focus, or other features. Features may be encapsulated in image descriptors, which are a set of features characterizing a portion of the image. Image descriptors may be represented as vectors or arrays. In some embodiments, supervised or unsupervised learning may be used to associate image descriptors to certain body parts. In some embodiments, part-based models may be used to constrain the possible locations of body parts based on the constraints of joints within the human body. In step 307, an arm location model is applied to one or more body part keypoints and predicts a direction in which a user is pointing or other arm state. An arm location model may be a machine learning model that accepts body part keypoints as inputs and returns a predicted state of the arm or gestures. In some embodiments, a set of predicted states or gestures may be returned by the arm location model with associated confidence values indicating the probability that the state or gesture is present. In some embodiments, the arm location model may be trained with supervised learning by providing a labeled set of training examples associating a set of body part keypoints and the correct state or gesture. In other embodiments, the arm location model may be created with unsupervised learning. In step 308, the location of a body part associated with a hand, such as a hand, palm, wrist, or finger, is determined based on the body part keypoints. A body pose may include one or more body part keypoints identifying the location of the hands, palms, wrists, fingers, or other body parts associated with or near a hand. In step 309, one or more cropped images of the user's hands are created by cropping the image frame near one or more body part keypoints representing a body part associated with a hand, such as body part keypoints representing the hands, palms, wrists, or fingers. In step 310, hand pose estimation may be performed on one or both cropped images of the user's hands to determine the pose of the hand or hands, as represented by keypoints. The hand pose estimation may return coordinates of one or more hand keypoints that are determined from the cropped images of the user's hands. Hand keypoints include an identifier of a particular body part in the hand, such as the first joint of the index finger, and a location in three-dimensional space. In step 311, a hand gesture model is applied to the one or more hand keypoints to predict the state of a hand of the user. A hand gesture model may be a machine learning model that accepts hand keypoints as inputs and returns a predicted state of the hand or hand gesture. In some embodiments, a set of predicted states or gestures may be returned with associated confidence values indicating the probability that the state or gesture is present. In some embodiments, the hand gesture model may be trained with supervised learning by providing a labeled set of training examples associating a set of hand keypoints and the correct state or gesture. In other embodiments, unsupervised learning may be used to create the hand gesture model. In step 312, an electronic device is controlled based on the predicted state of the hand of the user. Moreover, the computer system may determine an overall gesture of the user from the user's body pose, arm location, and the user's hand state. The computer system may use other aspects of the overall gesture in addition to the hand state to control an electronic device. For example, a user pointing with his index finger with his arm facing left may be interpreted as something different from a user pointing with his index finger with his arm facing upwards.

For the purpose of detecting gestures to control electronic devices, it may be advantageous to perform many of the steps described as quickly and accurately as possible. In one embodiment, prior to doing pose estimation calculations, the computer system runs a motion detector to isolate the specific areas of an image where there is motion. These areas of the image are likely to contain people. Cropping the image frame to this area and performing subsequent calculations in this area may accelerate the speed of calculations. Similarly, the methods described above may isolate the likely areas where hands are located, further accelerating calculations of hand keypoints by restricting the calculations to a small area of the image. Accuracy of the detection of gestures may be increased by calculating the gesture model in two high level steps. The first for the full body, and the second for the user's hands. Each calculation may include calculating pose keypoints and then running a gesture model that accepts the pose keypoints as input and outputs a predicted state.

Many variants of the described processes are possible. The processes herein such as, but not limited to, methods 200 and 300 may have more or fewer steps. Steps of the methods 200 and 300 are optional and may be omitted. Moreover, the steps may be performed in different orders or in parallel.

It is contemplated that methods 200 and 300 may be performed on scenes involving two or more users. The methods 200 and 300 may be performed for each user in the scene. Thus, for example, motion may be detected representing multiple users and multiple bounding boxes created, one bounding box enclosing each user. The image frame may be cropped around the bounding boxes to create multiple images, one image for each user. Body pose estimation may be performed for each user to determine one or more body part keypoints of each user. Then arm location models may be applied to each user to determine the directions in which they are pointing. The locations of a body part associated with the user's hands may be determined based on the body part keypoints, and one or more cropped images of the users' hands may be created by cropping the images near the body part keypoints representing the body part associated with the hands. Coordinates of the one or more hand keypoints may be determined for each user from the cropped images of the users' hands. Hand gesture models may be applied for each user to predict the state of the hands of each user. One or more electronic devices may be controlled based on the predicted state of the users' hands.

In some embodiments, only full body pose gestures are detected and hand keypoints are not calculated. For example, one variant of method 200 may perform steps 201 to 204 and not the remainder of the steps. Similarly, one variant of method 300 may perform steps 301 to 306 and not the remainder of the steps.

In another embodiment, the angle of a user's arm may be determined instead of or in addition to direction. In steps 305 to 306 applying the body pose estimation and arm location model, the angle of a user's arm may be determined. The angle may be measured using two or more coordinates, such as horizontal and vertical coordinates, for example 60 degrees vertical and 40 degrees horizontal. The angle of the user's arm or arms may be used for gesture control instead of or in addition to the direction of pointing.

Other embodiments may include additional sensors. One embodiment may include two or more cameras. Another embodiment may include a depth sensor. The additional sensors may provide more data used for gesture recognition. With two cameras, body pose estimation may be performed using the two images to determine the body part keypoints and/or hand keypoints. At steps of methods 200 and 300 where the image frame is cropped, both of the images from the two cameras may be cropped. For example, both images may be cropped around the motion detected in an image frame before body pose estimation is performed, and both images may be cropped near the body part keypoints representing a user's wrists or hands before hand keypoints are calculated.

Similarly, with a depth sensor, the depth data may be used in the body pose estimation to determine the body part keypoints and/or hand keypoints. At steps of methods 200 and 300 where the image frame is cropped, the depth data may also be cropped. For example, the depth data may be cropped around the motion detected in an image frame before body pose estimation is performed, and the depth data may be cropped near the body part keypoints representing a user's wrists or hands before hand keypoints are calculated.

In another embodiment, gesture recognition may be performed on a still image rather than a video. For example, in a variant of method 200, in step 202, motion of a user is detected using a motion sensor and a still image captured with a digital camera. The coordinates of the motion in the still image are provided by the motion sensor. The still image may be cropped based on the coordinates of the motion detected by the motion detector. Processing in method 200 may continue from step 203 as shown in FIG. 2.

In a variant of method 300, in step 302, motion of a user is detected using a motion sensor and a still image captured with a digital camera. The coordinates of the motion in the still image are provided by the motion sensor. The coordinates determined by the motion sensor may be used to create a bounding box around the coordinates of the motion, and the still image may be cropped based on the bounding box to create a cropped image. Processing in method 300 may continue from 303 as shown in FIG. 3.

Figure 4:
FIG. 4 illustrates an exemplary image frame that may be used in some embodiments.

FIG. 4 illustrates an exemplary image frame 401 that may be provided. Such an image frame 401 may be collected from a video camera, such as in hardware sensor device 101.

Figure 5:
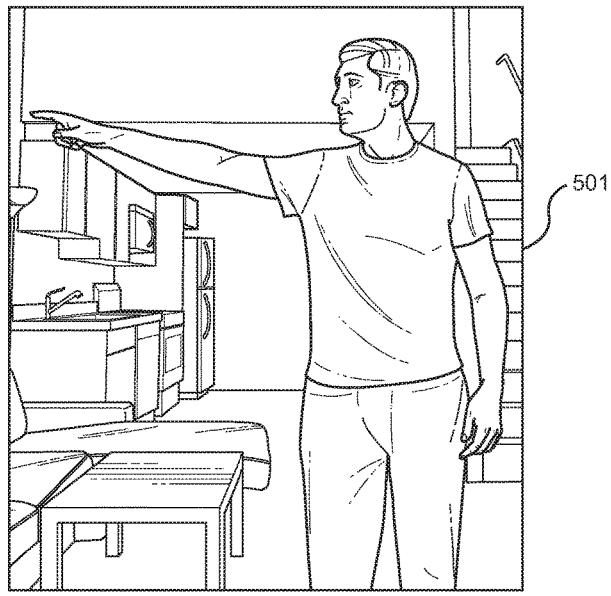
FIG. 5 illustrates an exemplary cropped image that may be created in some embodiments.

FIG. 5 illustrates an exemplary cropped image 501. In the image frame 401, a bounding box may be created around the motion in the image frame 401 based on the coordinates of the motion. The image frame 401 may then be cropped based on the bounding box to create the cropped image 501.

Figure 6:
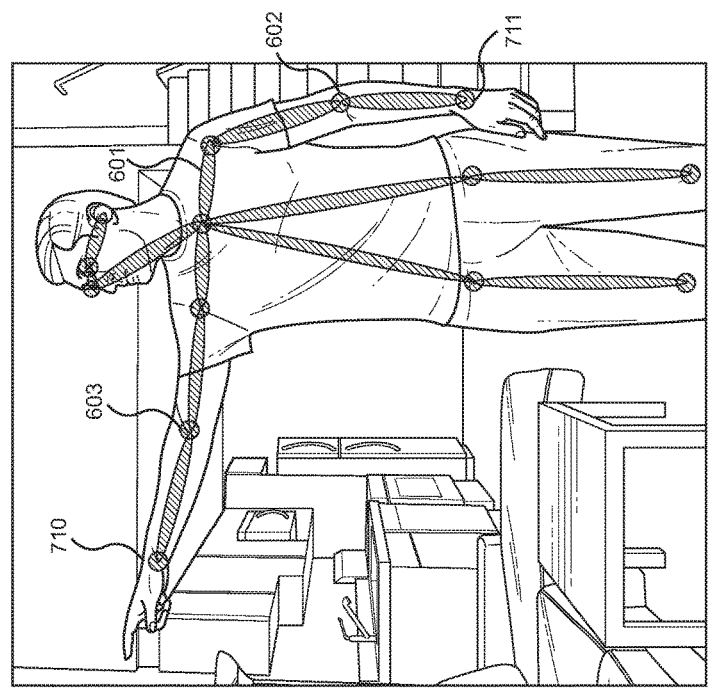
FIG. 6 illustrates exemplary full body pose estimation on a cropped image that may be used in some embodiments.

FIG. 6 illustrates an exemplary full body pose estimation 601 performed on the cropped image. One or more body part keypoints may be identified in the full body pose estimation, such as keypoints 603, 604, 710, 711. Exemplary keypoints may be represented as tuples of numerical values that describe locations and confidence levels of detected body parts. Body part keypoints may represent the locations of body parts such as wrists, elbows, shoulders, chest, hips, knees, feet, head, face, eyes, ears, temples, and so on. An exemplary format for a series of keypoints may be:
[931.785,437.888,0.912407,1029.8,588.676,0.8555, 897.927,584.888,0.79514,705.499,566.078,0 0.818217, 498.225,517.052,0.805196,1154.23,599.964,0.784383, 1221.96,803.709,0.853831,1225. 8,995.886,0.83414, 939.333,1011.01,0.566688,935.573,1346.56,0.388906,0,0, 0,1105.24,1007.16, 0.565667,1109.04,1354.12,0.50593,0,0, 0,931.726,415.271,0.560063,961.914,407.879,0.901622, 0,0,0]

Where every 3 numerical values represents a tuple of values: [X1, Y1, confidence_1], indicating the X and Y location of the keypoint identifying a body part or portion thereof on the image, and its associated confidence value. Confidence values may be calculated on a scale of 0 to 1, indicating how confident the computer system is that the keypoint correctly identifies the location of the associated body part. In an exemplary embodiment, 17 body part keypoints are used. In other embodiments, the number of body part keypoints may number 5-10, 10-20, 15-25, at least 10, at least 20, at least 30, or so on.

An arm location model may be applied to the body part keypoints to predict the direction that a user is point in or the angle of the user's arm or arms. The output of the arm location model may be a set of states or gestures and the associated probabilities that the state or gesture is present. An exemplary output of an arm location model is presented in the following table, showing the predicted gesture in the left column and the confidence value that this is the correct gesture in the right column.

| Gesture | Probability |
| --- | --- |
| Right Arm Up | 2.1% |
| Right Arm Right | 0.9% |
| Right Arm Left | 99.4% |
| Left Arm Up | 0.5% |
| Left Arm Right | 0.2% |
| Left Arm Left | 0.3% |

In the above exemplary model, the model predicts that user has their right arm pointing to the left because it has the highest probability.

Figure 7:
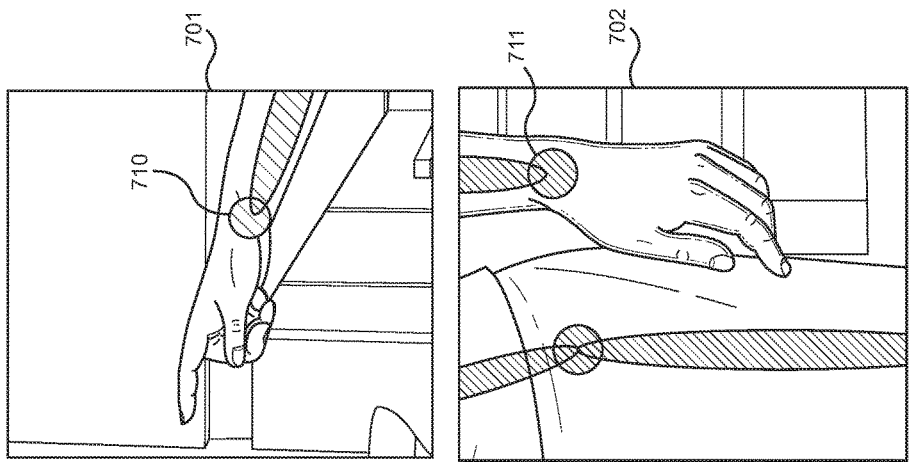
FIG. 7 illustrates exemplary cropped images of the user's hands that may be created in some embodiments.

FIG. 7 illustrates exemplary cropped images of the user's hands 701, 702. In some embodiments, the cropped images of the user's hands 701, 702 may be created by cropping the image frame near the body part keypoints identifying the user's wrists 710, 711 or another body part associated with the user's hands.

Figure 8:
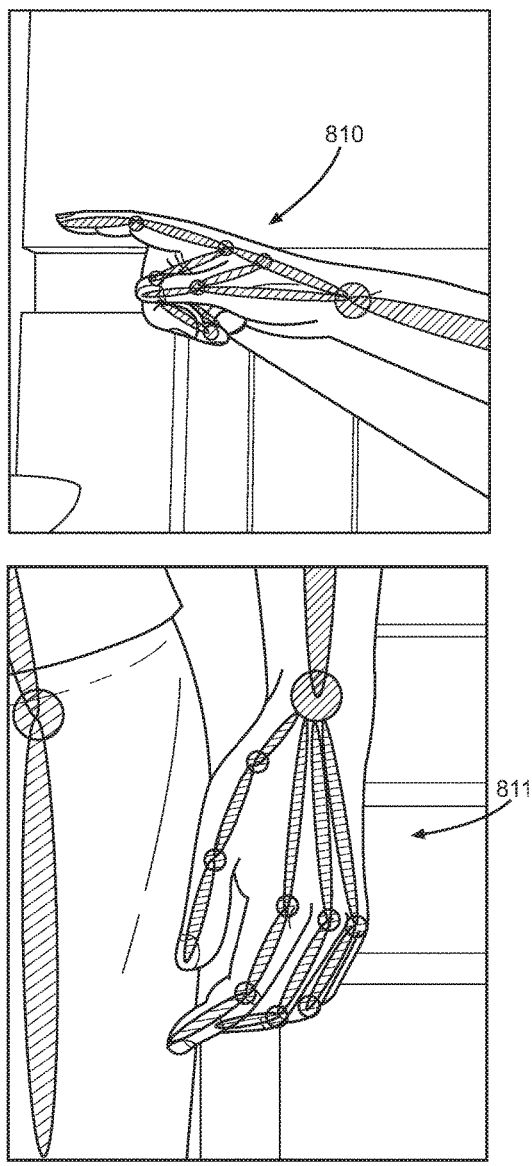
FIG. 8 illustrates exemplary hand keypoints that may be determined from one or more cropped images of the hands of the user.

FIG. 8 illustrates the exemplary hand keypoints 810, 811 determined from one or more cropped images of the hands of the user 701, 702. Hand keypoints 810, 811 may represent the positions of various parts of a user's hands in a scene. The hand keypoints 810, 811 may be represented in the same or similar format to the body part keypoints using tuples including an X and Y coordinate and confidence value. In an exemplary embodiment, 20 hand keypoints are used. In other embodiments, the number of hand keypoints may number 5-10, 10-20, 15-25, at least 10, at least 20, at least 30, or so on.

A hand gesture model may be applied to the hand keypoints to predict the gesture or state of one or more of the user's hands. Based on the hand keypoints, the model predicts a gesture or state. The output of the hand gesture model may be a set of states or gestures and the associated probabilities that the state or gesture is present. An exemplary output of a hand gesture model is presented in the following table, showing the predicted gesture in the left column and the confidence value in the right column.

| Gesture | Probability |
|---|---|
| Right Hand Open | 92% |
| Right Hand Closed | 0.5% |
| Right Hand Index Finger | 2.3% |
| Left Hand Open | 93% |
| Left Hand Closed | 0.6% |
| Left Hand Index Finger | 0.9% |

In the above exemplary model, the model predicts that user's left and right hands are open because they have the highest probabilities.

Figure 9:
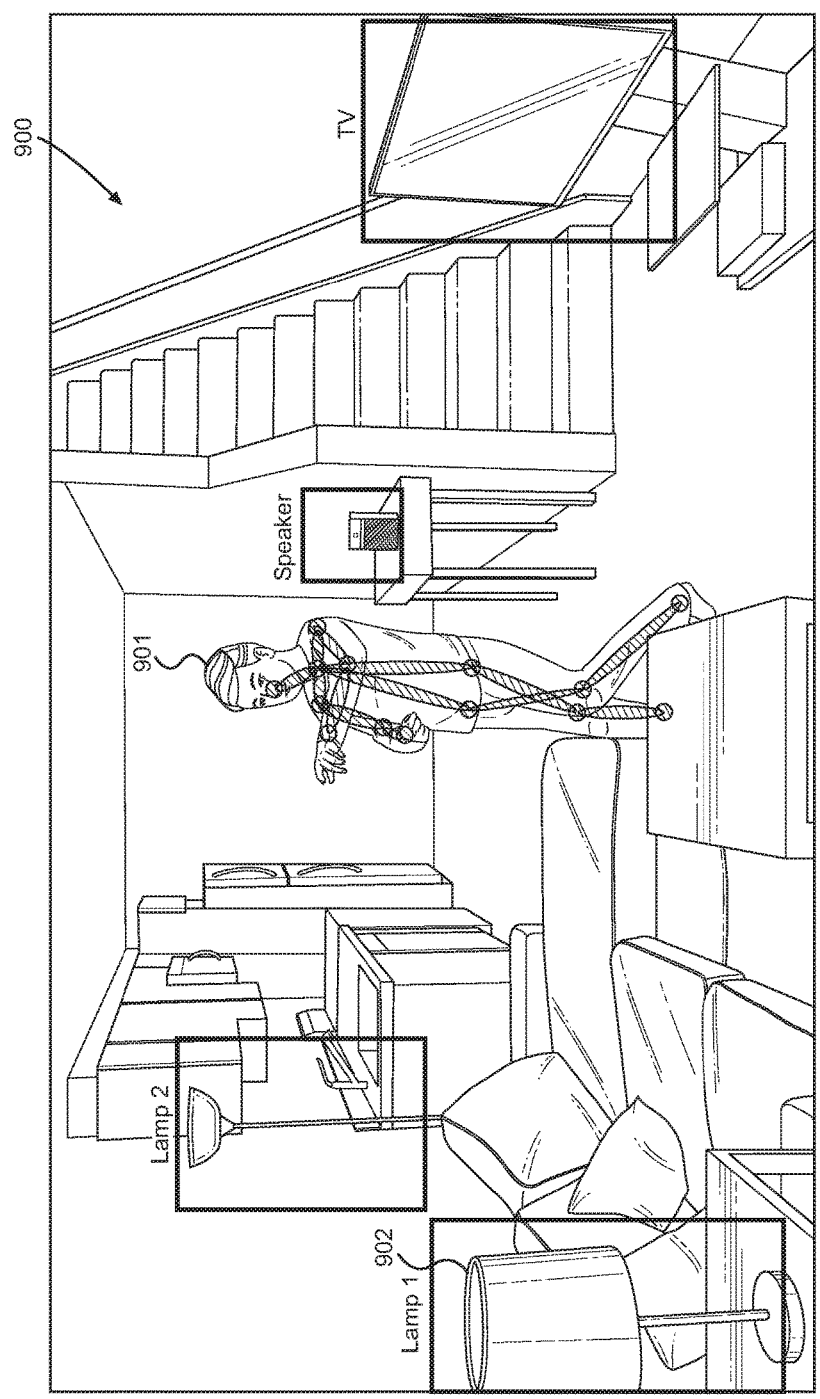
FIG. 9 illustrates an exemplary scene collected from a video camera.

FIG. 9 illustrates an exemplary scene 900 collected from a video camera. In this image, there is one user 901 on which body pose estimation has been performed. The arm gestures of the user 901 may be determined. The arm gesture of the user 901 may be determined to be a pointing gesture to the left of the scene. As a result of the pointing to the left gesture, an object 902 to the left of the user may be controlled. In this example, the system determines that the lamp 902 that the user is pointing at should be turned on and sends a signal to turn on the lamp 902. The image also shows bounding boxes around electronic, controllable devices. These devices can be identified either by object detection by the computer system or by pre-configuration by the user.

Figure 10:
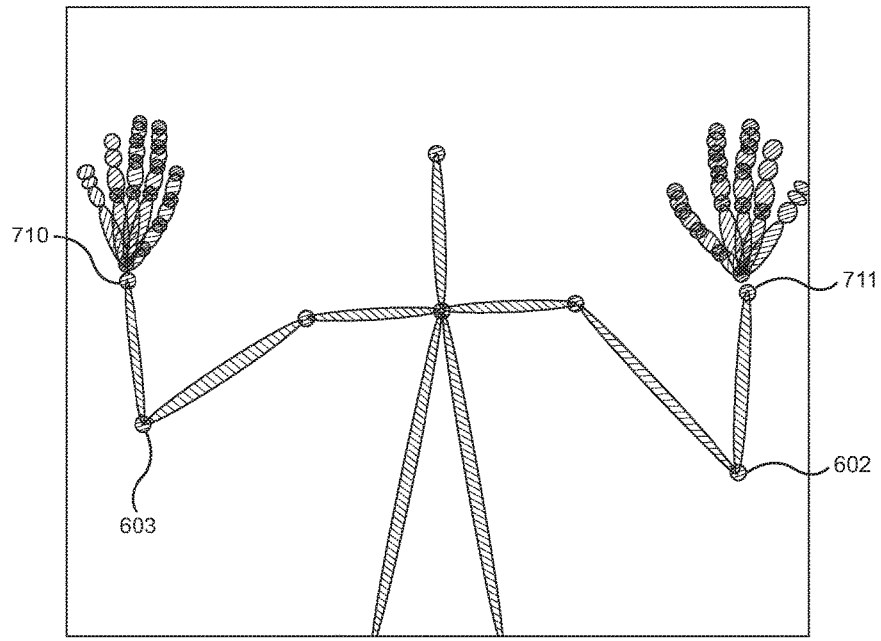
FIG. 10 illustrates exemplary body part keypoints in some embodiments.

FIG. 10 illustrates exemplary body part keypoints, such as keypoints 602, 603, 710, 711. More or fewer body part keypoints may exist in various embodiments.

Figure 11:
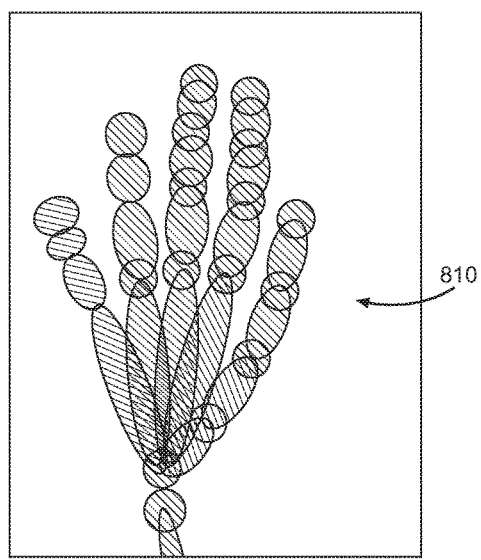
FIG. 11 illustrates exemplary hand keypoints in some embodiments.

FIG. 11 illustrates exemplary hand keypoints 810. In other embodiments, more or fewer hand keypoints may be used. In one embodiment, a hand keypoint is used to represent the wrist, each finger-tip, and each joint in each finger and knuckle in the user's hand.

Figure 12:
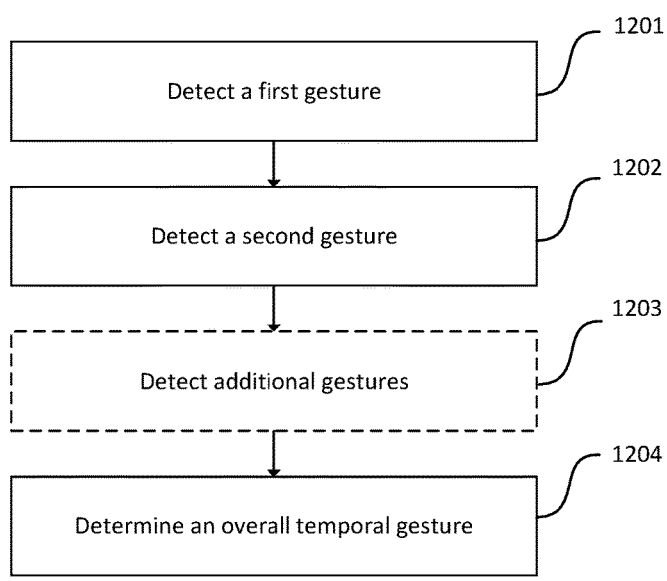
FIG. 12 is a flow chart illustrating an exemplary method that may be performed in some embodiments.

FIG. 12 illustrates an exemplary method 1200 where a computer system analyzes multiple image frames in order to detect multi-frame gestures. Using this method, the computer system may detect gestures that cross multiple image frames, for example a grasp and drag gesture, arm raising or lowering gesture, or first raising or lowering gesture.

In step 1201, the computer system detects a first gesture. It may detect the first gesture using, for example, methods 200 or 300. The first gesture may comprise any or all of a user hand state, a user arm state, and a user body pose. In step 1202, the computer system detects a second gesture, which may also be detected using methods 200 or 300. The second gesture may comprise any or all of a user hand state, a user arm state, and a user body pose. In step 1203, the computer system may continue on to detect additional gestures, such as a third, fourth, fifth, and so on, gestures in the same manner. In step 1204, the computer system may determine an overall temporal gesture based on the first gesture and second gesture, and any additional gestures such as the third, fourth, fifth, and additional gestures. In this manner, the computer system may detect discrete gestures in different image frames and combine these gestures to determine an overall gesture that spans multiple frames. This gesture may be referred to as a temporal gesture because the gesture occurs across time.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed:

1. A computer-implemented method for controlling an electronic device by computer recognition of human gestures, the method comprising:

detecting, by a computer system, motion of a user in an image frame of a video;

determining coordinates of the motion in the image frame;

creating a bounding box around the motion in the image frame based on the coordinates of the motion;

cropping the image frame based on the bounding box around the motion to create a first cropped image;

performing full-body pose estimation on the cropped image to determine coordinates of one or more body part keypoints;

applying an arm location machine learning model to one or more body part keypoints and predicting a user arm state, wherein the predicted user arm state comprises a predicted direction that the user is pointing;

determining the location of the hands of the user based on the body part keypoints;

creating one or more cropped images of the hands of the user by identifying a location and dimensions to crop based on one or more body part keypoints associated with the hands;

determining coordinates of one or more hand keypoints from the one or more cropped images of the hands of the user, wherein determining the coordinates of the hand keypoints is performed in a separate step after the step of determining the coordinates of the body part keypoints;

applying a hand gesture machine learning model to the one or more hand keypoints to predict a user hand state, wherein the predicted user hand state comprises an associated confidence value that the predicted user hand state is correct;

selecting one of a plurality of electronic devices for control based on the predicted user arm state and controlling the electronic device based on the combination of the predicted user hand state and the predicted user arm state.

2. The method of claim 1, further comprising:
performing full-body pose estimation on a plurality of users in the image frame;
determining coordinates of one or more hand keypoints for the plurality of the users;
controlling one or more electronic devices based on the gestures of the plurality of users.

3. The method of claim 1, wherein the user hand state is one of open, closed, or pointing.

4. The method of claim 1, wherein the user arm state is one of pointing left, right, up, or down.

5. The method of claim 1, further comprising:
controlling a television based on the user hand state.

6. The method of claim 1, further comprising:
applying an arm location model to predict the angle of the arm of the user.

7. The method of claim 1, further comprising:
collecting data from a depth sensor.

8. The method of claim 1, further comprising:
collecting video data from at least two video cameras.

9. The method of claim 1, further comprising:
determining a first user gesture at a first time;
determining a second user gesture at a second time;
determining a temporal gesture based on the first user gesture at the first time and second user gesture at the second time;
controlling the electronic device based on the temporal gesture.

10. The method of claim 1, further comprising:
comparing a pixel value in a first frame to a corresponding pixel value in a second frame;
when the difference between the pixel value in the first frame and the corresponding pixel value in the second frame exceeds a threshold, setting a flag that motion is detected in the second frame and storing an indication of the location of the detected motion.

11. A method for determining a body pose and a hand gesture of a user, the method comprising:
detecting, by a computer system, motion of a user in an image frame of a video;
cropping the image frame around the motion of the user to create a cropped image;
determining the body pose of the user from the cropped image;
predicting a user arm state based on the body pose of the user, wherein the predicted user arm state comprises a predicted direction that the user is pointing;
creating one or more cropped images of the hands of the user based on one or more predicted locations of the hands from the body pose by identifying a location and dimensions to crop based on one or more body part keypoints associated with the hands;
predicting the state of a hand of the user from the one or more cropped images of the hands of the user, wherein the predicted state of the hand comprises an associated confidence value that the predicted state of the hand is correct, wherein predicting the state of the hand is performed in a separate step after the step of determining the body pose of the user;
selecting one of a plurality of electronic devices for control based on the predicted user arm state and controlling the electronic device based on the combination of the predicted state of the user's hand and the predicted user arm state.

12. The method of claim 11, further comprising:
performing full-body pose estimation on a plurality of users in the image frame;
determining coordinates of one or more hand keypoints for the plurality of users;
controlling one or more electronic devices based on the gestures of the plurality of users.

13. The method of claim 11, wherein the state of the hand of the user is one of open, closed, or pointing.

14. The method of claim 11, further comprising predicting a direction in which the user is pointing.

15. The method of claim 11, further comprising:
controlling a television based on the predicted state of the hand of the user.

16. The method of claim 11, further comprising:
applying an arm location model to predict the angle of the arm of the user.

17. The method of claim 11, further comprising:
collecting data from a depth sensor.

18. The method of claim 11, further comprising:
collecting video data from at least two video cameras.

19. The method of claim 11, further comprising:
determining a first user gesture at a first time;
determining a second user gesture at a second time;
determining a temporal gesture based on the first user gesture at the first time and second user gesture at the second time;
controlling the electronic device based on the temporal gesture.

20. The method of claim 11, further comprising:
comparing a pixel value in a first frame to a corresponding pixel value in a second frame;
when the difference between the pixel value in the first frame and the corresponding pixel value in the second frame exceeds a threshold, setting a flag that motion is detected in the second frame and storing an indication of the location of the detected motion.

* * * * *